United States Patent
Lim et al.

(10) Patent No.: US 8,768,083 B2
(45) Date of Patent: Jul. 1, 2014

(54) APPARATUS AND METHOD FOR ENCODING IMAGES, AND APPARATUS AND METHOD FOR DECODING IMAGES

(75) Inventors: Jeongyeon Lim, Gyeonggi-do (KR); Sunyeon Kim, Seoul (KR); Gyumin Lee, Gyeonggi-do (KR); Jaehoon Choi, Gyeonggi-do (KR); Jongki Han, Seoul (KR); Yunglyul Lee, Seoul (KR); Joohee Moon, Seoul (KR); Haekwang Kim, Seoul (KR); Byeungwoo Jeon, Gyeonggi-do (KR); Youngjoe Yoo, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 142 days.

(21) Appl. No.: 13/581,206

(22) PCT Filed: Feb. 25, 2011

(86) PCT No.: PCT/KR2011/001329
§ 371 (c)(1),
(2), (4) Date: Nov. 12, 2012

(87) PCT Pub. No.: WO2011/105849
PCT Pub. Date: Sep. 1, 2011

(65) Prior Publication Data
US 2013/0089264 A1    Apr. 11, 2013

(30) Foreign Application Priority Data
Feb. 26, 2010    (KR) .................. 10-2010-0017530

(51) Int. Cl.
*G06K 9/36* (2006.01)
*H04N 7/26* (2006.01)
*H04N 7/32* (2006.01)
*H04N 7/34* (2006.01)

(52) U.S. Cl.
CPC ... *H04N 19/00278* (2013.01); *H04N 19/00569* (2013.01); *H04N 19/00763* (2013.01)
USPC .......................... 382/238; 382/233

(58) Field of Classification Search
None
See application file for complete search history.

(56) References Cited

U.S. PATENT DOCUMENTS

| | | | |
|---|---|---|---|
| 8,295,351 B2 * | 10/2012 | Palfner et al. | 375/240.13 |
| 2007/0071087 A1 * | 3/2007 | Kim et al. | 375/240.1 |
| 2008/0152005 A1 * | 6/2008 | Oguz et al. | 375/240.12 |
| 2011/0206130 A1 * | 8/2011 | Koto et al. | 375/240.21 |

FOREIGN PATENT DOCUMENTS

| | | |
|---|---|---|
| KR | 10-2001-0064266 | 7/2001 |
| KR | 10-2007-0027981 | 3/2007 |
| KR | 10-2009-0110892 | 10/2009 |

OTHER PUBLICATIONS

International Search Report mailed Nov. 1, 2011 for PCT/KR2011/001329.

* cited by examiner

*Primary Examiner* — Li Liu
(74) *Attorney, Agent, or Firm* — Lowe Hauptman & Ham, LLP

(57) ABSTRACT

Image encoding/decoding apparatus and method are disclosed. The image encoding apparatus includes: a target block splitter for splitting a target block of an input image to be encoded into a plurality of subblocks according to positions of pixels; a key block encoding unit for selecting a random key block, the size of which is larger than a pixel size of at least one of the plurality of subblocks split by the target block splitter, and performing an intra-prediction or inter-prediction encoding process on the selected key block; and a non-key block encoding unit for designating the rest of the subblocks, except for the selected key block, as a non-key block, and performing a spatial prediction process on the designated non-key block by using a key block reconstructed by the key block encoding unit and values of peripheral pixels of a current block.

18 Claims, 9 Drawing Sheets

*FIG. 5*

| A |  |  |  | B |  |  |  | C |
|---|---|---|---|---|---|---|---|---|
|  | I (sb0) (0,0) | I (sb1) (0,0) | I (sb2) (0,0) | I (sb3) (0,0) | I (sb0) (1,0) | I (sb1) (1,0) | I (sb2) (1,0) | I (sb3) (1,0) |
|  | I (sb4) (0,0) | I (sb5) (0,0) | I (sb5) (0,0) | I (sb7) (0,0) | I (sb4) (1,0) | I (sb5) (1,0) | I (sb5) (1,0) | I (sb7) (1,0) |
|  | I (sb8) (0,0) | I (sb9) (0,0) | I (sb10) (0,0) | I (sb11) (0,0) | I (sb8) (1,0) | I (sb9) (1,0) | I (sb10) (1,0) | I (sb11) (1,0) |
| D | I (sb12) (0,0) | I (sb13) (0,0) | I (sb14) (0,0) | I' (sb15) (0,0) | I (sb12) (1,0) | I (sb13) (1,0) | I (sb14) (1,0) | I' (sb15) (1,0) |

*FIG. 6*

APPARATUS AND METHOD FOR ENCODING IMAGES, AND APPARATUS AND METHOD FOR DECODING IMAGES

CROSS REFERENCE TO RELATED APPLICATION

This application claims the priority of Korean Patent Application No. 10-2010-0017530, filed on Feb. 26, 2010 in the KIPO (Korean Intellectual Property Office). Further, this application is the National Phase application of International Application No. PCT/KR2011/001329 filed Feb. 25, 2011, which designates the United States and was published in Korean.

TECHNICAL FIELD

The present disclosure relates to an apparatus and method for encoding images, and an apparatus and method for decoding images. More particularly, the present disclosure relates to an apparatus and method for encoding images and an apparatus and method for decoding images which can increase the video compression efficiency while maintaining the original video quality in the encoding and decoding processes with an unprecedented capability of effectively removing the spatial redundancy known to be persistent in the video blocks throughout the existing inter/intra prediction even when bigger coding unit blocks are used for encoding high resolution videos.

BACKGROUND

The statements in this section merely provide background information related to the present disclosure and may not constitute prior art.

Video data needs encoding into a compression to effectively store or transmit the data. There are known video data compression technologies such as H.261, H.263, H.264, MPEG-2 and MPEG-4. Such compression technologies divide each frame image data of a video into luminance or luma components and chrominance or chroma components which are then subdivided by unit of macroblocks for carrying out encoding process.

The most recent video compression technology, H.264/AVC is a joint development by MPEG (Moving Picture Experts Group) and VCEG (Video Coding Experts Group) and is improved over the existing video compressing method that is MPEG-4 to provide a better compression ratio while maintaining the quality of the video.

FIG. 1 is a block diagram showing an existing H.264/AVC video encoder. The existing H.264/AVC video encoder shown in FIG. 1 performs inter-prediction, intra-prediction, transform, quantization, entropy coding, or the like, to encode input image data. Data with the redundancy removed is compressed through transform and quantization processes. The compressed data is entropy-encoded into a bitstream.

As shown in FIG. 1, H.264 processes a current image 110 at input by inter-predicting at 130 referring to a reference image 120 and then motion-compensating at 140 to predict pixel values of a current block, or has the current image intra-predicted at 150 and used for predicting the pixel values of the current block with their spatial redundancies removed. The differences of the predicted values from the current image are used as the basis for calculating the prediction errors which are then transformed and quantized at 160 and entropy-encoded at 170 into a bitstream for transmission. At the same time, the transformed and quantized values undergo an inverse transform and inverse quantization process at 180 and add to the predicted values, and the sum goes through a filtering at 190 for reducing the blocking artifacts before composing a reconstructed image at 195.

Here, the inter prediction process is to remove temporal redundancy, whereby the macroblock is subdivided into smaller blocks sized 16×16, 16×8, 8×16, 8×8, 8×4, 4×8, 4×4 to be motion predicted and motion compensated, when there may be up to sixteen reference frames used for the motion prediction and motion compensation. In addition, H.264/AVC may utilize ¼ pixel interpolation to improve the compression ratio while maintaining the image quality when compared to the existing MPEG-4 video compression technology.

The intra-prediction process is to remove spatial redundancy, whereby the macroblock is subdivided in units of 16×16, 8×8, and 4×4 blocks to be intra-predicted. More specifically, the intra-prediction mode carried out in units of 16×16 blocks is referred to as 16×16 intra-prediction, and the intra-prediction mode carried out in units of 16×16 blocks is referred to as a 16×16 intra-prediction. The intra-prediction carried out by dividing the macroblock in units of four 8×8 blocks is referred to as 8×8 intra-prediction. The intra-prediction mode carried out by dividing the macroblock into sixteen 4×4 blocks is referred to as 4×4 intra-prediction.

In the case of I and SI pictures on which only the intra-prediction is applicable, the optimal intra-prediction mode is an optimal mode of a current macroblock. On the other hand, in the case of S, SP, B pictures on which both the intra-prediction and the inter-prediction are applicable, a mode having the lowest cost, either the intra-prediction mode or the inter-prediction mode, is selected as an optimal mode. Generally, a cost for each mode is calculated using an H.264 rate-cost function as expressed in Equation 1.

$$J(i) = D(i) + \lambda \times R(i) \quad \text{Equation 1}$$

In Equation 1, D(i) represents an error occurring in a mode i, and R(i) represents a bit generated when encoded in the mode i. λ represents a Lagrange multiplier.

An optimal mode is determined among the possible modes by using Equation 2.

$$i^* = \arg\min_{i \in C}\{J(i)\} \quad \text{Equation 2}$$

In Equation 2, C represents an available mode. If the type of the picture to be currently coded is P, the P picture has a mode of C∈{SKIP, 16×16, 16×8, 8×16, P8×8, I4, I8, I16}|.

When the optimal prediction mode is determined, the existing H.264/AVC video encoder transforms and quantizes a difference value between a block to be encoded and a predicted block, which is then entropy-coded. At this time, the difference value is entropy-coded in the selected optimal prediction mode.

The next-generation encoding standard aiming to efficiently encode high-resolution images is planned to increase the coding unit block size to 32×32 or 64×64, which is larger than the existing coding unit block size 16×16. In encoding high resolution videos, if the coding unit block size increases, spatial redundancy in a block increases. Therefore, there is a need for a method that can effectively remove the spatial redundancy.

DISCLOSURE

Technical Problem

Therefore, to solve the above-mentioned problems, the present embodiments seek to provide an apparatus and method for encoding images and an apparatus and method for decoding images, which can effectively remove the spatial redundancy in a block even when bigger coding unit blocks are used for encoding high resolution videos.

SUMMARY

An embodiment of the present disclosure provides an image encoding apparatus, including: a target block splitter for splitting a target block of an input image to be encoded into a plurality of subblocks according to positions of pixels; a key block encoding unit for selecting a random key block having a size larger than a pixel size of at least one of the plurality of subblocks split by the target block splitter, and performing an intra-prediction or inter-prediction encoding process on the selected key block; and a non-key block encoding unit for designating the rest of the subblocks, except for the selected key block, as a non-key block, and performing a spatial prediction process on the designated non-key block by using values of peripheral pixels of a current block and a key block reconstructed by the key block encoding unit.

The target block splitter may split the target block, expressed as $2^m \times 2^n|$, into the subblocks, the size of which is any one of $2^m \times 2^n$, $2^{m-1} \times 2^n$, $2^m \times 2^{n-1}$, $2^{m-1} \times 2^{n-1}$, $2^{m-2} \times 2^n$, ..., $2^0 \times 2^0|$, where m and n are natural numbers.

When the size of the subblock is determined as being $2^{m-m_0} \times 2^{n-n_0}|$ with respect to the target block expressed as $2^m \times 2^n|$, the target block splitter may split the target block into the subblocks by using the following equation:

$$I_{sb_k}(x, y) = I\left(x2^{m_0} + k \%(2^{m_0}), y2^{n_0} + \left\lfloor \frac{k}{2^{m_0}} \right\rfloor \right), 0 \le x < \frac{M}{2^{m_0}},$$

$$0 \le y < \frac{N}{2^{n_0}}$$

I(x, y) represents a pixel value (x, y)| at coordinates of the current block, $I_{sb_k}$ represents a kth subblock, % represents a modulo operation, $\lfloor \ \rfloor$ represents a rounding-down operation, and a basic block is split into $2^{m_0} \times 2^{n_0}$ subblocks, where M and N are horizontal and vertical sizes of each block, respectively.

The key block encoding unit may include: a transform/quantization unit for predicting pixel values of the selected key block, calculating an error value from a current pixel, transforming and quantizing a calculated error value, and transmitting a transformed and quantized error value to an entropy encoder; an inverse transform/inverse quantization unit for performing an inverse transform and inverse quantization process on a value that is transformed and quantized by the transform/quantization unit; and a memory buffer for accumulating output values of the inverse transform/inverse quantization unit and reconstructing the key block.

The non-key block encoding unit may include: a transform/quantization unit for predicting pixel values of the non-key block, calculating an error value from a current pixel, transforming and quantizing a calculated error value, and transmitting a transformed and quantized error value to an entropy encoder; an inverse transform/inverse quantization unit for performing an inverse transform and inverse quantization process on a value that is transformed and quantized by the transform/quantization unit; and a memory buffer for accumulating output values of the inverse transform/inverse quantization unit and reconstructing the non-key block.

The image encoding apparatus may further include: a transform/quantization unit for calculating a prediction error value by intra-prediction or inter-prediction on the target block of the input image, transforming and quantizing a calculated prediction error value, and transmitting a transformed and quantized prediction error value to an entropy encoder; an inverse transform/inverse quantization unit for performing an inverse transform and inverse quantization process on a value that is transformed and quantized by the transform/quantization unit; a merging unit for merging a key block reconstructed on the base of the key block encoding unit and a non-key block reconstructed by the non-key block encoding unit; and a memory buffer for accumulating output values of the inverse transform/inverse quantization unit and reconstructing a reference block from a value merged by the merging unit.

Another embodiment of the present disclosure provides an image decoding apparatus, including: an entropy decoder for reading encoding information and subblock information of a target block to be decoded, with respect to inputs of encoded signals; a key block decoding unit for, when the target block is determined by the entropy decoder to be key-block-encoded and non-key-block-encoded, selecting a key block based on the subblock information read from the encoded signals, and reconstructing pixel values of the key block selected among subblocks corresponding to the subblock information; a non-key block decoding unit for designating the rest of the subblocks, except for the selected key block among the subblocks, as a non-key block, and reconstructing the non-key block by performing a spatial prediction process on the designated non-key block by using values of peripheral pixels of a current block and a key block reconstructed by the key block decoding unit; and a merging unit for merging a value reconstructed by the key block decoding unit and a value reconstructed by the non-key block decoding unit.

The key block decoding unit may include: an inverse transform/inverse quantization unit for performing an inverse transform and inverse quantization process on a signal corresponding to a key block encoding among the input encoded signals; a prediction unit for predicting pixel values of the selected key block; and a key block reconstructing unit for adding output values of the inverse transform/inverse quantization unit to predicted values from the prediction unit and reconstructing the selected key block.

The non-key block decoding unit may include: an inverse transform/inverse quantization unit for performing an inverse transform and inverse quantization process on a signal corresponding to a non-key block encoding among the input encoded signals; a spatial prediction unit for performing a spatial prediction process by using the values of the peripheral pixels of the current block and the key block reconstructed by the key block decoding unit; and a non-key block reconstructing unit for adding an output value of the inverse transform/inverse quantization unit to a predicted value by the spatial prediction unit, and reconstructing the designated non-key block.

The image decoding apparatus may further include an inverse transform/inverse quantization unit for performing an inverse transform/inverse quantization process on the input encoded signals.

In this case, a signal reconstructing unit may reconstruct the target block by adding a value merged by the merging unit to accumulated values output from the inverse transform/inverse quantization unit.

Yet another embodiment of the present disclosure provides an image encoding method, including: splitting a target block of an input image to be encoded into a plurality of subblocks according to positions of pixels; selecting a random key block having a size larger than a pixel size of at least one of the plurality of split subblocks, and performing an intra-prediction or inter-prediction encoding process on the selected key block; and designating the rest of the subblocks, except for the selected key block among the split subblocks, as a non-key block, and performing a spatial prediction process on the designated non-key block by using values of peripheral pixels of a current block and a key block reconstructed by performing the intra-prediction or inter-prediction encoding process on the selected key block.

The image encoding method may further include: predicting pixel values of the selected key block, calculating an error value from the current pixel, transforming and quantizing a calculated error value, and transmitting a transformed and quantized error value to an entropy encoder; performing an inverse transform and inverse quantization process on the transformed and quantized error value; and adding an inversely transformed and inversely quantized output value to a predicted value, and reconstructing the selected key block.

The image encoding method may further include: predicting pixel values of the designated non-key block, calculating an error value from a current pixel, transforming and quantizing a calculated error value, and transmitting a transformed and quantized error value to an entropy encoder; performing an inverse transform and inverse quantization process on the transformed and quantized error value; and accumulating inversely transformed and inversely quantized output values and reconstructing the designated non-key block.

The image encoding method may further include: calculating a prediction error value by intra-prediction or inter-prediction on the target block of the input image, transforming and quantizing a calculated prediction error value, and transmitting a transformed and quantized prediction error value to an entropy encoder; performing an inverse transform and inverse quantization process on the transformed and quantized error value; and accumulating output values by the inverse transform and inverse quantization process and reconstructing the target block by adding to a value merged by the merging process.

Yet another embodiment of the present disclosure provides an image decoding method, including: reading encoding information and subblock information of a target block to be decoded, with respect to input encoded signals; when the target block is determined by the process of reading to be key-block-encoded and non-key-block-encoded, selecting a key block based on the subblock information read from the encoded signals, and performing a prediction process on pixel values of the key block selected among subblocks corresponding to the subblock information; designating the rest of the subblocks, except for the selected key block among the subblocks, as a non-key block, and performing a spatial prediction process on the designated non-key block by using values of peripheral pixels of a current block and a key block reconstructed based on the prediction process on the key block; and reconstructing the input encoded signals based on a value predicted by the prediction process on the key block and a value predicted by the spatial prediction process on the non-key block.

The image decoding method may further include: performing an inverse transform and inverse quantization process on a signal corresponding to a key block encoding among the input encoded signals; and adding a value output by the inverse transform/inverse quantization process to the value predicted by the prediction process, and reconstructing the selected key block.

The image decoding method may further include: performing an inverse transform and inverse quantization process on a signal corresponding to a non-key block encoding among the input encoded signals; and adding a value output by the inverse transform/inverse quantization process to a value predicted by the spatial prediction process, and constructing the designated non-key block.

The image decoding method may further include: performing an inverse transform/inverse quantization process on the input encoded signals; and merging a key block reconstructed based on the prediction process on the key block and a non-key block reconstructed by the prediction process on the non-key block, wherein the process of reconstructing the encoded signals reconstructs the target block by adding a value merged by the merging process to accumulated values output by the inverse transform/inverse quantization process.

Advantageous Effects

According to the present embodiments as described above, the video compression efficiency can be increased while maintaining the original video quality in the encoding and decoding processes with an unprecedented capability of effectively removing the spatial redundancy known to be persistent in the video blocks throughout the existing inter/intra prediction even when bigger coding unit blocks are used for encoding high resolution videos.

DESCRIPTION OF DRAWINGS

FIG. 5 shows an example of a 16×16 block that is subdivided into subblocks;

FIG. 6 shows an example of a reconstructed key block and peripheral pixels;

DETAILED DESCRIPTION

Figure 1:
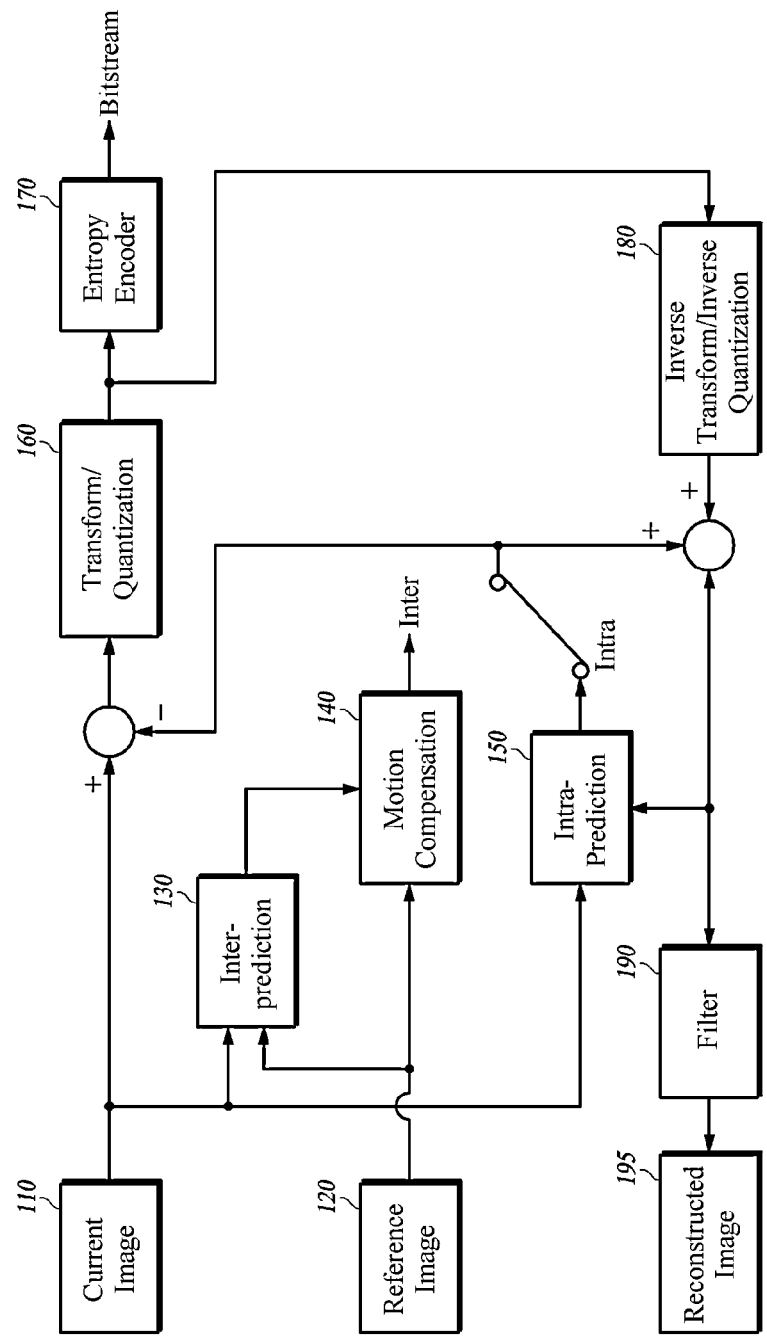
FIG. 1 is a block diagram schematically showing a general H.264/AVC encoder according to one embodiment of the present disclosure.

Hereinafter, embodiments of the present disclosure will be described in detail with reference to the accompanying drawings. In the following description, the same elements will be designated by the same reference numerals although they are shown in different drawings. Further, in the following description of the present embodiments, a detailed description of known functions and configurations incorporated herein will be omitted when it may make the subject matter of the present embodiments rather unclear.

Additionally, in describing the components of the present embodiments, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
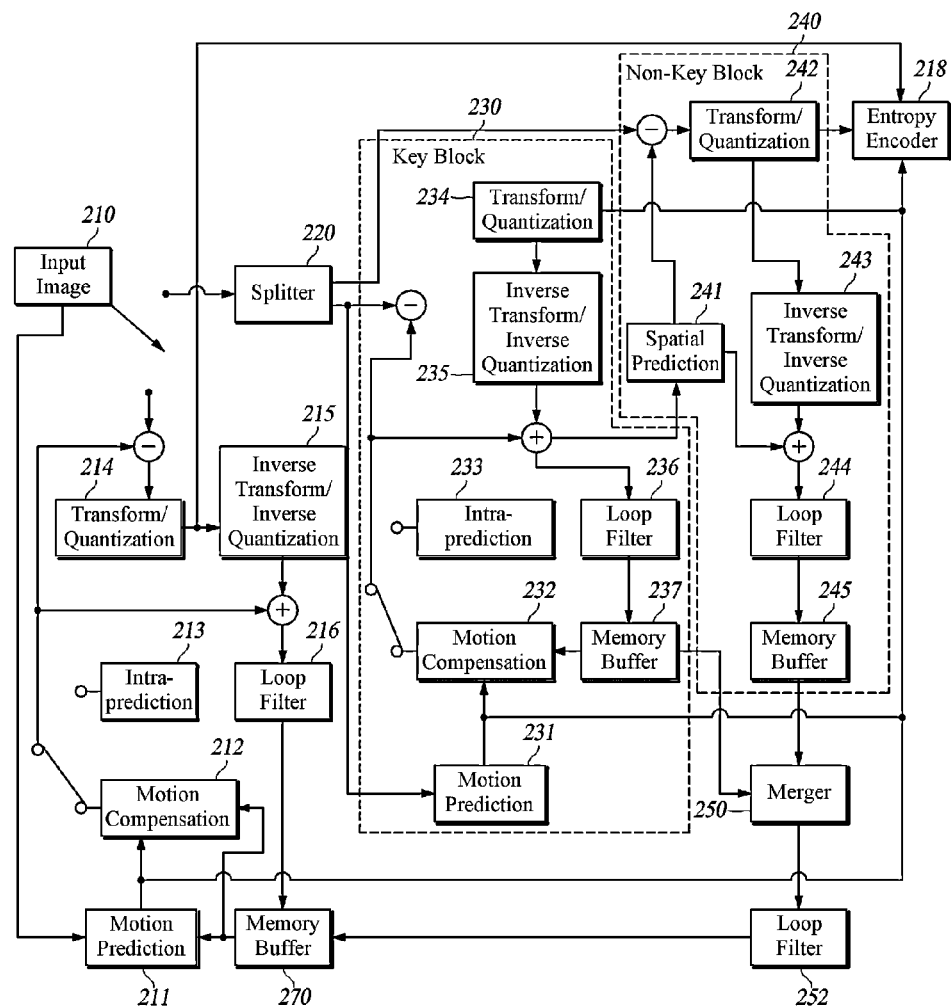
FIG. 2 is a block diagram schematically showing an image encoding apparatus according to one embodiment of the present disclosure.
Figure 3:
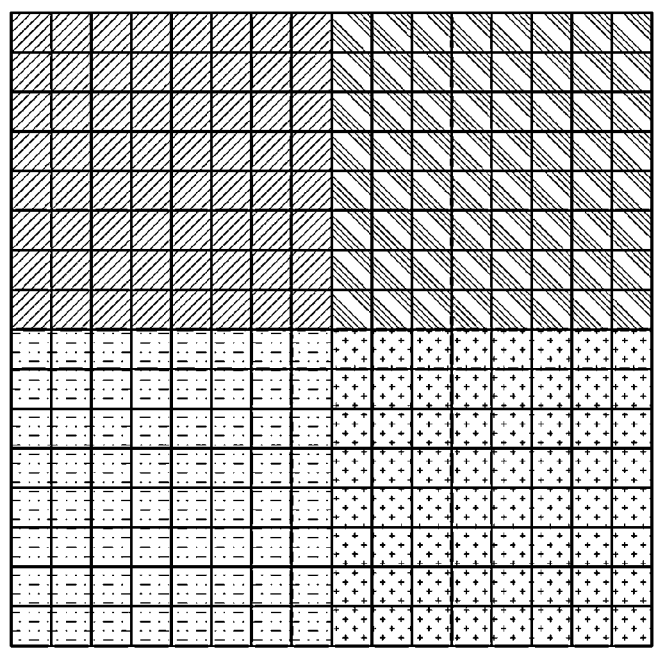
FIG. 3 shows an example of splitting into subblocks in accordance with the H.264 standard.

FIG. 2 is a block diagram schematically showing an image encoding apparatus according to one embodiment. Referring to FIG. 2, the image encoding apparatus includes a target block splitter 220, a key block encoding unit 230, and a non-key block encoding unit 240. The target block splitter 220 splits a target block of an input image 210 to be encoded into a plurality of subblocks according to positions of pixels. The key block encoding unit 230 selects a random key block, the size of which is larger than a pixel size of at least one of the plurality of subblocks split by the target block splitter 220, and performs an intra-prediction or inter-prediction process on the selected key block. The non-key block encoding unit 240 designates the rest of the subblocks, except for the selected key block, as a non-key block, and performs a spatial prediction process on the designated non-key block by using key block reconstructed on the base of the key block encoding unit 230 and values of peripheral pixels of the current block. Here, the spatial prediction is the intra-prediction that is carried out by the non-key block encoding unit 240. The term "spatial prediction" is used herein so as to avoid confusion with the intra-prediction of the general image encoding apparatus.

The image encoding apparatus and the image decoding apparatus described hereinafter may be a user terminal including a personal computer or PC, notebook or laptop computer, personal digital assistant or PDA, portable multimedia player or PMP, PlayStation Portable or PSP, or mobile communication terminal, or may be a server terminal including an application server and a service server, and may represent a variety of apparatuses equipped with, for example, a communication device such as a modem for carrying out communication between various devices or wired/wireless communication networks, a memory for storing data and various programs for encoding or decoding images, and a microprocessor for executing the programs to effect operations and controls.

In addition, the image encoded into a bitstream by the image encoding apparatus may be transmitted in real time or non-real-time to the image decoding apparatus for decoding the same where it is reconstructed and reproduced into the image after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

A video may typically include a series of pictures each of which is divided into predetermined areas, such as blocks. When each picture is divided into blocks, each of the blocks is classified into an intra-block or an inter-block depending on an encoding method. The intra-block means the block that is encoded through an intra-prediction encoding which is within a current picture where the current encoding is performed for generating a predicted block by predicting a current block by using pixels of a reconstructed block that underwent previous encoding and decoding and then encoding the differential value of the predicted block from the pixels of the current block. The inter-block means the block that is encoded through an inter-prediction encoding which generates the predicted block by predicting the current block in the current picture through referencing one or more past pictures or future pictures and then encoding the differential value of the predicted block from the current block. Here, the frame that is referenced in encoding or decoding the current picture is called a reference frame.

Meanwhile, the input image 210 may be encoded in accordance with the processes defined in the general H.264 standard of FIG. 1, without undergoing the key block encoding process by the key block encoding unit 230 and the non-key block encoding process by the non-key block encoding unit 240. That is, the prediction error is calculated based on a difference between a current image and values predicted by inter-predicting at 211 and 212 or intra-predicting at 213. The calculated prediction error may be transformed and quantized at 214 and entropy-encoded at 218 into a bitstream for transmission. In addition, the transformed and quantized values undergo an inverse transform and inverse quantization process at 215 and add to the predicted values, and the sum goes through a filtering at 216 for reducing the blocking artifacts and accumulates in a memory buffer 270 before composing a reconstructed image.

The target block splitter 220 may split a target block of an input image 210 to be encoded into a plurality of subblocks according to positions of pixels. In the case of the H.264 standard, the target block of the input image is split into subblocks. This concept is to group peripheral pixels into a plurality of subblocks. However, the target block splitter 220 according to one embodiment of the present disclosure splits the target block into a plurality of subblocks according to positions of pixels composing the target block, instead of dividing the target block on the basis of peripheral pixels.

For example, the size of the target block may be expressed as a power of 2. Generally, in the video compression, the macroblock is set by sizing the target block to 16×16. When the size of the target block to be encoded is M×N, the size M×N of the target block may be expressed as $2^m \times 2^n$. At this time, the size of the subblock may be any one of $2^m \times 2^n$, $2^{m-1} \times 2^n$, $2^m \times 2^{n-1}$, $2^{m-1} \times 2^{n-1}$, $2^{m-2} \times 2^n$, ..., $2^0 \times 2^0$, where m and n represent natural numbers.

The target block splitter 220 selects one of the sizes of the subblocks and splits the basic block into subblocks. For example, when $2^{m-m_0} \times 2^{n-n_0}$ is determined as the size of the subblock, the basic block is split into $2^{m_0} \times 2^{n_0}$ subblocks. The basic block is split into subblocks by using Equation 3.

$$I_{sb_k}(x, y) = I\left(x 2^{m_0} + k \, \%(2^{m_0}), y 2^{n_0} + \left\lfloor \frac{k}{2^{m_0}} \right\rfloor \right), \quad \text{Equation 3}$$

$$0 \leq x < \frac{M}{2^{m_0}},$$

$$0 \leq y < \frac{N}{2^{n_0}}$$

Figure 4:
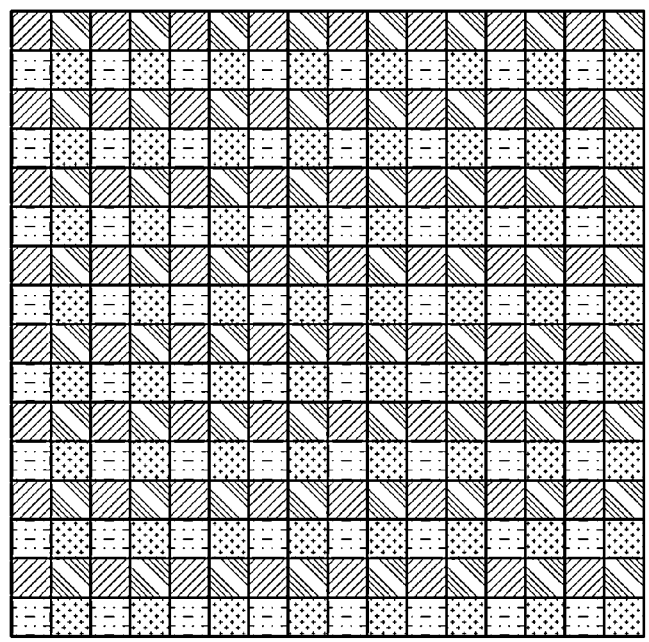
FIG. 4 shows an example of splitting into subblocks according to one embodiment of the present disclosure.
Figure 5:
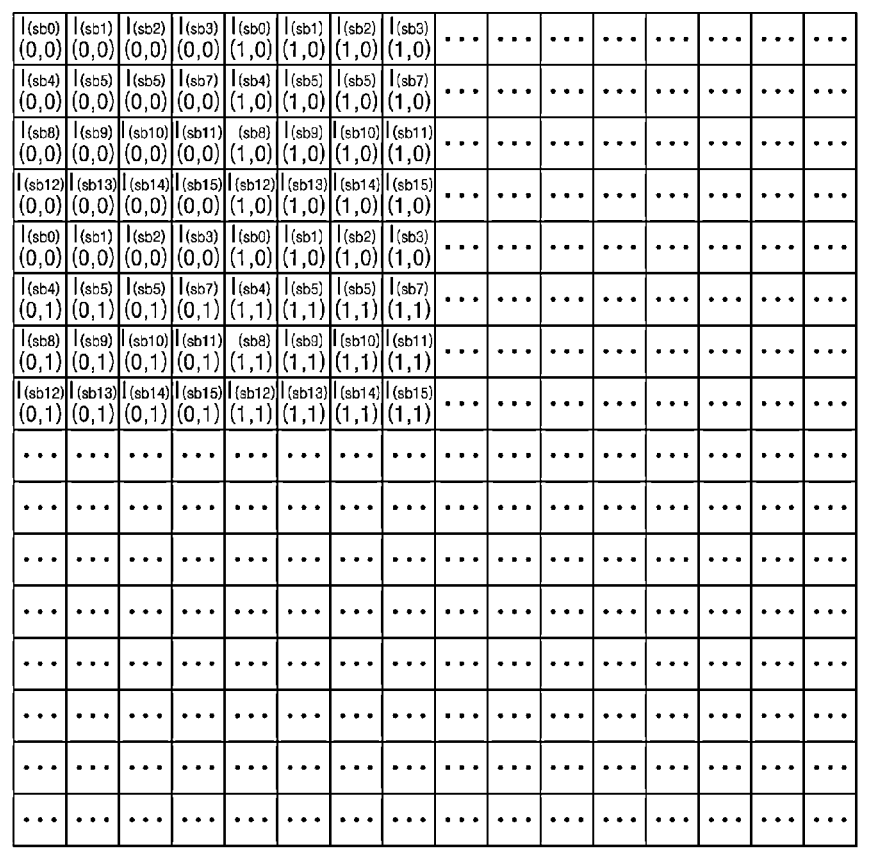

In Equation 3, I(x, y) represents a pixel value at (x, y) coordinates of a current block. $I_{sb_k}$ represents a $k^{th}$ subblock, and % represents a modulo operation. $\lfloor \, \rfloor$ represents a rounding-down operation. From Equation 3 above, subblocks from $I_{sb_0}(x, y)$ to $I_{sb(2^{m_0} \times 2^{n_0} - 1)}(x, y)$ may be generated. In FIG. 4, the pixels are represented in various shapes so as to describe the splitting of the 16×16 target block into subblocks according to positions of pixels. In addition, FIG. 5 shows a case in which the 16×16 block is split into sixteen subblocks. Here, each of the subblocks has a 4×4 block size.

The key block encoding unit 230 selects a random key block, the size of which is larger than a pixel size of at least one of the plurality of subblocks split by the target block splitter 220, or designates a preset $k^{th}$ block as a key block. The rest of the subblocks, except for the key block, may be designated as a non-key block by the non-key block encoding unit 240. Prior to the decoding, the key blocks may be encoded earlier than the non-key blocks.

The key block encoding unit 230 may include a transform/quantization unit 234, an inverse transform/inverse quantization unit 235, and a memory buffer 237.

The transform/quantization unit 234 predicts pixel values of the selected key block through the inter-prediction 213 and 232 or the intra-prediction 233, calculates an error value from the current pixel, transforms and quantizes the calculated error value, and transmits the resultant value to the entropy encoder 218. For example, as shown in FIG. 5, when the 16×16 target block is split into a plurality of 4×4 subblocks, and the subblock $I_{sb15}$ among the plurality of subblocks is selected as the key block, the key block encoding unit 230 performs an inter-prediction or intra-prediction process on the subblock selected as the key block. At this time, the size of the predicted block is not limited to the 4×4 block, but may be set to various sizes. The predicted residual blocks are frequency-transformed and quantized, and then transmitted to the entropy encoder 218 which compresses the block into a bitstream.

The inverse transform/inverse quantization unit 235 decodes the quantized signal through inverse quantization and inverse frequency transform. The memory buffer 237 accumulates output values of the inverse transform/inverse quantization unit 235 and generates the reconstructed block $I'_{sb15}$ for the key block. In order to reduce distortions of the reconstructed block, a filtering process 236 for deblocking may be added.

The non-key block having undergone the target block splitter 220 is encoded and decoded by the non-key block encoding unit 240 of FIG. 2. For this purpose, the non-key block encoding unit 240 may include a transform/quantization unit 242, an inverse transform/inverse quantization unit 243, and a memory buffer 245. The transform/quantization unit 242 predicts pixel values of the non-key block, calculates an error value from the current pixel, transforms and quantizes the calculated error value, and transmits the resultant value to the entropy encoder 218. The inverse transform/inverse quantization unit 243 performs an inverse transform and inverse quantization on the transformed and quantized values output from the transform/quantization unit 242. The memory buffer 245 accumulates output values of the inverse transform/inverse quantization unit 243 and reconstructs the non-key block. As shown in FIG. 6, the non-key block encoding unit 240 calculates the predicted values of the relevant non-key block in accordance with the intra-prediction by using the key block reconstructed based on the key block encoding unit 230 and the peripheral reconstructed pixels of the current block. The predicted value of the non-key block may be calculated by using Equation 4. This is referred to as spatial prediction.

$$P_{sb_k}(i, j) = I'_{sb_{15}}(i-1, j-1) \times (2^{m_0} - d_x) \times (2^{n_0} - d_y) + \\ I'_{sb_{15}}(i, j-1) \times (d_x) \times (2^{n_0} - d_y) + \\ I'_{sb_{15}}(i-1, j) \times (2^{m_0} - d_x) \times (d_y) I'_{sb_{15}}(i, j) \times (d_x) \times (d_y)$$

Equation 4

In Equation 4, $P_{sb_k}(i, j)$ represents the predicted pixel value at a position (i, j)| of a kth subblock. Negative coordinate values like $I'_{sb_{15}}(-1, 0)$| mean the values of the peripheral pixels of the current block.
In this case, $I'_{sb_{15}}(-1, 0)$ represents a pixel value at a position D. Equation 4 is merely an example of a method for generating a prediction signal, but is not limited thereto.

After the spatial prediction, the residual blocks of the predicted block and the non-key block undergo the transform and quantization 242 and are then transmit to the entropy encoder 218.

As in the case of the key block encoding unit 230, the inverse transform/inverse quantization unit 243 decodes the quantized signal through the inverse quantization and inverse frequency transform. The memory buffer 245 accumulates output values of the inverse transform/inverse quantization unit 243 and generates the reconstructed block for the non-key block. In order to reduce distortions of the reconstructed block, a filtering process 244 for deblocking may be added.

In the process of predicting the key block, it is efficient that only modes used frequently among the prediction modes are utilized as candidates. For example, the number of bits for encoding an index of a key block intra-prediction mode may be reduced by using only a vertical prediction mode, a horizontal prediction mode, or a DC prediction mode, which is frequently used in the intra-prediction.

In addition, the frequency transform and the quantization, which are used in the key block encoding unit 230 and the non-key block encoding unit 240, may utilize different types of transform and quantization from the general video codecs, depending on purposes. Furthermore, even though the quantization is performed in the same manner as the general quantization, a value of Qstep may be changed. For example, the quantization is performed with a smaller value of Qstep in order that a quantization error may be reduced in a reconstruction value of the key block. Additionally, the quantization may be performed with a large value of Qstep when it is necessary to encode the reconstruction value of the key block with a smaller number of bits.

The key block signal and the non-key block signal, which are reconstructed by the key block encoding unit 230 and the non-key block encoding unit 240, are merged by a merger 250. In the memory buffer 270, the merged signal is added to the signal reconstructed without undergoing the key block encoding unit 230 and the non-key encoding unit 240. In this manner, the target block is reconstructed.

Figure 7:
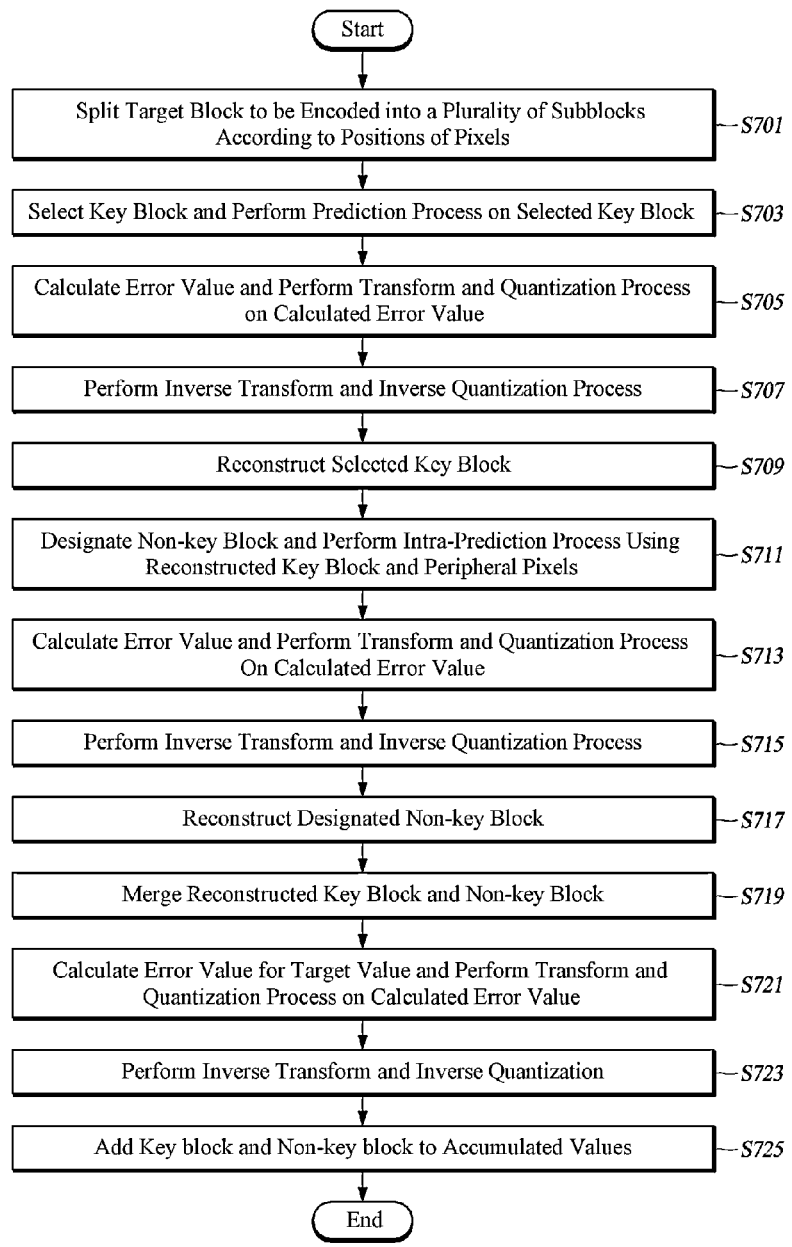
FIG. 7 is a flow chart showing an image encoding method that is carried out by the image encoding apparatus shown in FIG. 2.

FIG. 7 is a flow chart showing an image encoding method that is carried out by the image encoding apparatus shown in FIG. 2.

Referring to FIG. 7, the target block splitter 220 splits the target block of the input image to be encoded into a plurality of subblocks according to positions of pixels in step S701.

In step S703, the key block encoding unit 230 selects the key block among the plurality of split subblocks, and performs an intra-prediction or inter-prediction process according to the input image frame. In addition, in step S705, the key block encoding unit 230 calculates prediction errors, based on differences of the predicted values from the current image, which are then transformed, quantized and entropy-encoded into a bitstream for transmission. Meanwhile, the key block encoding unit 230 adds the transformed and quantized value to the value intra-predicted or inter-predicted through the inverse transform and the inverse quantization in step S707, and the sum goes through the filtering for reducing the blocking artifacts before the reconstruction into the key block in step S709.

In step S711, the non-key block encoding unit 240 predicts pixel values through the intra-prediction by using the key block reconstructed by the key block encoding unit 230 and the previously reconstructed peripheral pixels, with respect to the non-key blocks, except for the key block selected by the key block encoding unit 230 among the plurality of subblocks split by the target block splitter 220. In addition, in step S713, the non-key block encoding unit 240 calculates prediction errors, based on the difference of the spatial predicted values from the current image, which are then transformed, quantized and entropy-encoded into a bitstream for transmission. The non-key block encoding unit 240 adds the transformed and quantized value to the value intra-predicted through the inverse transform and the inverse quantization in step S715, and the sum goes through the filtering for reducing the blocking artifacts before the reconstruction into the non-key block in step S717. The reconstructed key block and non-key block are merged by the merger 250 in step S719.

Meanwhile, when the intra-prediction or the inter-prediction is performed on the target block, without passing through the key block encoding unit 230 and the non-key block encoding unit 240, the error values are calculated based on the differences of the predicted values from the current image, and the calculated error values are transformed, quantized and entropy-encoded in step S721. In addition, the transformed and quantized values undergo an inverse transform and inverse quantization process at 723, and add to the values merged by the merger 250 to reconstruct the target block in step S725. In this case, in order to reduce blocking artifacts, a filtering process may be added.

Figure 8:
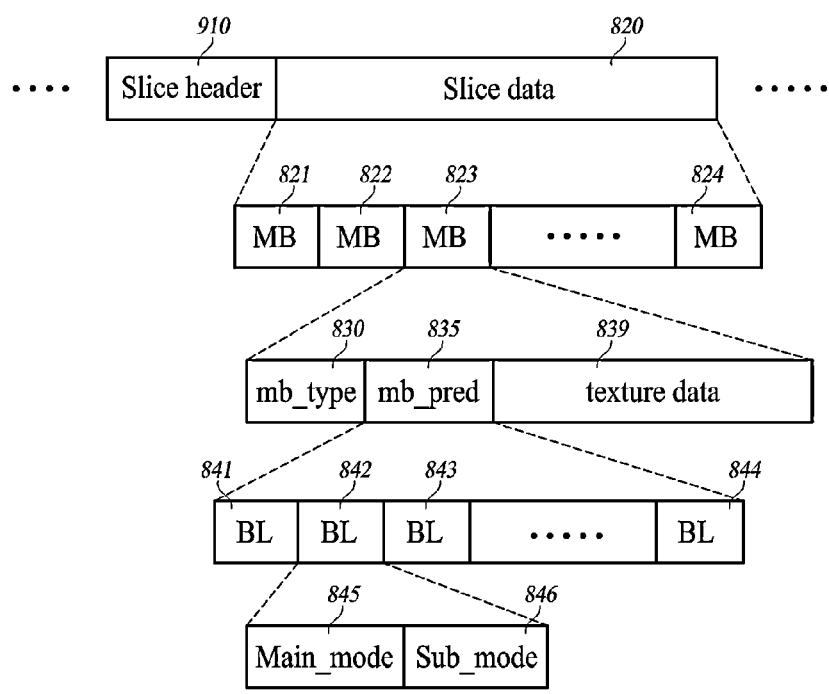
FIG. 8 schematically shows an image decoding apparatus according to one embodiment of the present disclosure.

The method of encoding the current image by division into the key block and the non-key block may be adaptively used in units of macroblock/slice/frame, and the relevant information may also be transmitted in units of macroblock/slice/frame. If necessary, information on the block selected as the key block may be transmitted. However, when the subblock located at the preset position is used as the key block, the transmission of the information on the key block may be skipped. FIG. 8 schematically shows the image decoding apparatus according to one embodiment of the present disclosure. Referring to FIG. 8, the image decoding apparatus may include an entropy decoder 810, a key block decoding unit 820, a non-key decoding unit 830, and a signal reconstructing unit 816. The entropy decoder 810 reads encoding information and subblock information of the target block to be decoded, with respect to the input encoded signal. When it is determined by the entropy decoder 810 that the target block is key-block-encoded and non-key-block-encoded, the key block decoding unit 820 selects the key block based on the subblock information read from the encoded signal, and predicts pixel values of the key block selected among the subblocks corresponding to the subblock information. The non-key block decoding unit 830 designates the rest of the subblocks, except for the key block, as the non-key block, and performs an intra-prediction process on the designated non-key block by using values of peripheral pixels of the key block reconstructed based on the key block decoding unit 820 and values of peripheral pixels of the current block. The signal reconstructing unit 816 decodes the input encoded signal based on the values predicted by the key block decoding unit 820 and the values predicted by the non-key block decoding unit 830.

The image decoding apparatus may further include an inter-prediction unit 812, an intra-prediction unit 813, an inverse transform/inverse quantization unit 814, and a filter 815. When the target block is neither key-block-encoded nor non-key-encoded, the inter-prediction unit 812 performs motion compensation and inter-prediction based on a reference image 811, in accordance with the general decoding procedures of the H.264 standard. The intra-prediction unit 813 performs intra-prediction from the current frame. The inverse transform/inverse quantization unit 814 performs an inverse transform and inverse quantization process on the input encoded signal. The filter 815 adds the intra-predicted or inter-predicted value to the inversely transformed or inversely quantized value and generates a reconstructed signal.

The key block decoding unit 820 may include an inverse transform/inverse quantization unit 824, prediction units 822 and 823, and a key block reconstructing unit 826. The inverse transform/inverse quantization unit 824 performs an inverse transform and inverse quantization process on the signal corresponding to the key block encoding among the input encoded signals. The prediction units 822 and 823 predict pixel values inter-predicted or intra-predicted with respect to the selected key block. The key block reconstructing unit 926 adds the output value of the inverse transform/inverse quantization unit 824 to the predicted values of the prediction units 822 and 823 and reconstructs the selected key block.

Also, the non-key block decoding unit 830 may include an inverse transform/inverse quantization unit 832, a spatial prediction unit 831, and a non-key block reconstructing unit 834. The inverse transform/inverse quantization unit 832 performs an inverse transform and inverse quantization process on the signal corresponding to the non-key block encoding among the input encoded signals. The spatial prediction unit 831 performs an intra-prediction process by using values of peripheral pixels of the key block reconstructed based on the key block decoding unit 820 and values of peripheral pixels of the current block. The non-key block reconstructing unit 834 adds the output value of the inverse transform/inverse quantization unit 832 and the predicted value by the spatial prediction unit 831 and reconstructs the designated non-key block.

The image decoding apparatus may further include a merging unit or merger 840 that merges the key block reconstructed based on the key block encoding unit 820 and the non-key block reconstructed by the non-key block decoding unit 830. The signal merged by the merger 840 is added to the signal reconstructed without undergoing the key block and non-key block encoding, whereby the target block is reconstructed.

Figure 9:
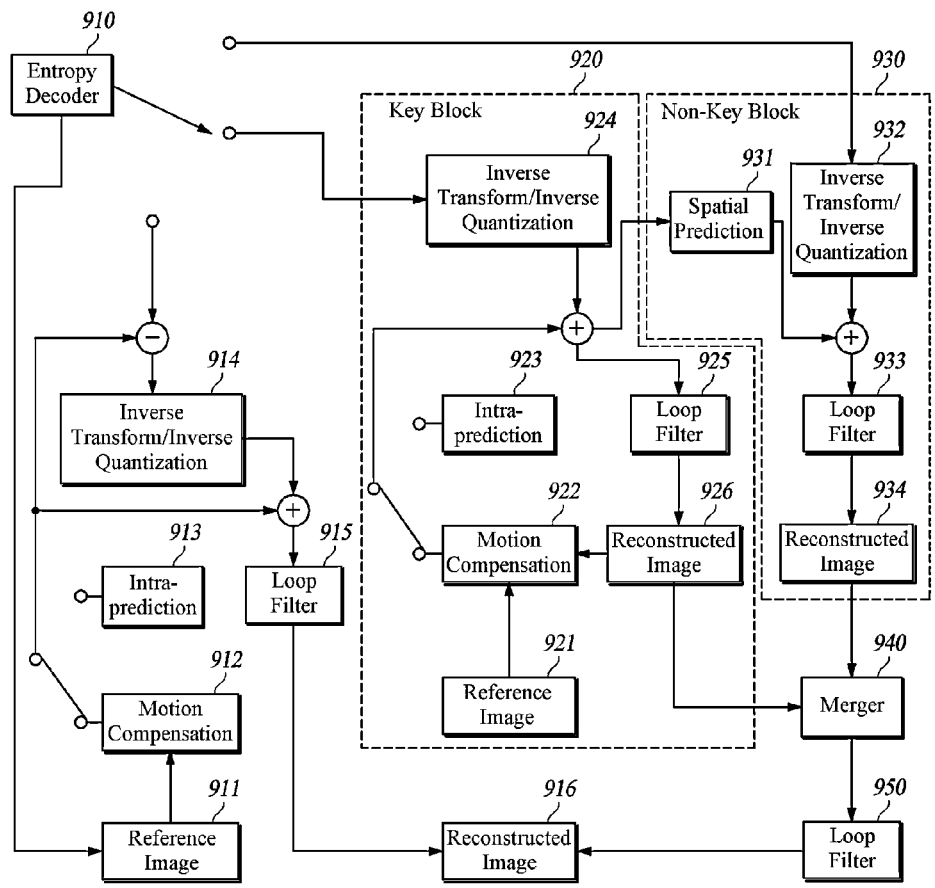
FIG. 9 is a flow chart shows an image decoding method that is carried out by the image decoding apparatus shown in FIG. 8.

FIG. 9 is a flow diagram showing an image decoding method that is carried out by the image decoding apparatus of FIG. 8.

Referring to FIG. 9, the entropy decoder 810 reads encoding information and subblock information of the target block to be decoded, with respect to the input encoded signal in step S901.

When it is determined by the entropy decoder 810 that the target block is key-block-encoded and non-key-block-encoded, the key block decoding unit 820 selects the key block among the subblocks, based on the read subblock information, and performs an intra-prediction or inter-prediction process based on the read information in step S903. In addition, the key block decoding unit 820 performs inverse transform and inverse quantization on the received encoded signal in step S905, adds the value output through the inverse transform and inverse quantization process to the inter-predicted or intra-predicted value, and reconstructs the key block through the filtering for reducing blocking artifacts in step S907.

The non-key block decoding unit 830 designates the non-key blocks, except for the key block selected by the key block decoding unit 820 among the subblocks read by the entropy decoder 810, and predicts the pixel values through the intra-prediction by using the key block reconstructed by the key block decoding unit 820 and the previously reconstructed peripheral pixels in step S909. In addition, the non-key block decoding unit 830 performs an inverse transform and inverse quantization process on the received encoded signal in step S911, adds the value output through the inverse transform and inverse quantization process to the intra-predicted value, and reconstructs the non-key block through the filtering for reducing blocking artifacts in step S913. The reconstructed key block and the non-key block are merged by the merger 840 in step S915.

Meanwhile, the image decoding apparatus performs an inverse transform and inverse quantization process on the signal encoded without undergoing the key block encoding unit 820 and the non-key block decoding unit 830 in step S917, adds the inversely transformed and inversely quantized signal to the value merged by the merger 840, and reconstructs the target block in step S919. In this case, a filtering process for reducing the blocking artifacts may be added.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the embodiments of the present disclosure are highly useful for application to the image compressing apparatus and the image decoding apparatus to increase video compression efficiency while maintaining the original video quality in the encoding and decoding processes with an unprecedented capability of effectively removing the spatial redundancy known to be persistent in the video blocks throughout the existing inter/intra prediction even when bigger coding unit blocks are used for encoding high resolution videos.

The invention claimed is:

1. An image encoding apparatus, comprising:
   a target block splitter for splitting a target block of an input image to be encoded into a plurality of subblocks according to positions of pixels;
   a key block encoding unit for selecting a random key block having a size larger than a pixel size of at least one of the plurality of subblocks split by the target block splitter, and performing an intra-prediction or inter-prediction encoding process on a selected key block; and
   a non-key block encoding unit for designating the rest of the subblocks, except for the selected key block, as a designated non-key block, and performing a spatial prediction process on the designated non-key block by using a key block reconstructed by the key block encoding unit and values of peripheral pixels of a current block.

2. The image encoding apparatus of claim 1, wherein the target block splitter splits the target block, expressed as $2^m \times 2^n$, into the subblocks having any one size of $2^m \times 2^n$, $2^{m-1} \times 2^n, 2^m \times 2^{n-1}, 2^{m-1} 33\ 2^{n-1}, 2^{m-2} \times 2^n, \ldots, 2^0 \times 2^0|$, where m and n are natural numbers.

3. The image encoding apparatus of claim 1, wherein when the size of the subblock is determined as being $2^{m-m_0} \times 2^{n-n_0}$ with respect to the target block expressed as $2^m \times 2^n|$, the target block splitter splits the target block into the subblocks by using the following equation:

$$I_{sb_k}(x, y) = I\left(x 2^{m_0} + k\,\%(2^{m_0}),\ y 2^{n_0} + \left\lfloor \frac{k}{2^{m_0}} \right\rfloor\right),\ 0 \le x < \frac{M}{2^{m_0}},$$

$$0 \le y < \frac{N}{2^{n_0}}$$

where,
   I(x, y) represents a pixel value at (x, y) coordinates of the current block,
   $I_{sb_k}$ represents a $k^{th}$ subblock,
   % represents a modulo operation,
   $\lfloor\ \rfloor$ represents a rounding-down operation, and
   a basic block is split into $2^{m_0} \times 2^{n_0}$ subblocks, where M and N are horizontal and vertical sizes of each block, respectively.

4. The image encoding apparatus of claim 1, wherein the key block encoding unit comprises:
   a transform/quantization unit for predicting pixel values of the selected key block, calculating an error value from a current pixel, transforming and quantizing a calculated error value, and transmitting a transformed and quantized error value to an entropy encoder;
   an inverse transform/inverse quantization unit for performing an inverse transform and inverse quantization process on a value that is transformed and quantized by the transform/quantization unit; and
   a memory buffer for accumulating output values of the inverse transform/inverse quantization unit and reconstructing the key block.

5. The image encoding apparatus of claim 1, wherein the non-key block encoding unit comprises:
   a transform/quantization unit for predicting pixel values of the non-key block, calculating an error value from a current pixel, transforming and quantizing a calculated error value, and transmitting a transformed and quantized error value to an entropy encoder;
   an inverse transform/inverse quantization unit for performing an inverse transform and inverse quantization process on a value that is transformed and quantized by the transform/quantization unit; and
   a memory buffer for accumulating output values of the inverse transform/inverse quantization unit and reconstructing the non-key block.

6. The image encoding apparatus of claim 1, further comprising:

a transform/quantization unit for calculating a prediction error value by intra-prediction or inter-prediction on the target block of the input image, transforming and quantizing a calculated prediction error value, and transmitting a transformed and quantized prediction error value to an entropy encoder;

an inverse transform/inverse quantization unit for performing an inverse transform and inverse quantization process on a value that is transformed and quantized by the transform/quantization unit;

a merging unit for merging a key block reconstructed on the base of the key block encoding unit and a non-key block reconstructed by the non-key block encoding unit; and a memory buffer for accumulating output values of the inverse transform/inverse quantization unit and reconstructing a reference block from a value merged by the merging unit.

7. An image decoding apparatus, comprising:

an entropy decoder for reading encoding information and subblock information of a target block to be decoded, with respect to inputs of encoded signals;

a key block decoding unit for, when the target block is determined by the entropy decoder to be key-block-encoded and non-key-block-encoded, selecting a key block based on the subblock information read from the encoded signals, and reconstructing pixel values of a selected key block among subblocks corresponding to the subblock information;

a non-key block decoding unit for designating the rest of the subblocks, except for the selected key block among the subblocks, as a non-key block, and reconstructing the non-key block by performing a spatial prediction process on a designated non-key block by using values of peripheral pixels of a current block and a key block reconstructed on the base of the key block decoding unit; and a merging unit for merging a value reconstructed by the key block decoding unit and a value reconstructed by the non-key block decoding unit.

8. The image decoding apparatus of claim 7, wherein the key block decoding unit comprises:

an inverse transform/inverse quantization unit for performing an inverse transform and inverse quantization process on a signal corresponding to a key block encoding among the inputs of the encoded signals;

a prediction unit for predicting pixel values of the selected key block; and a key block reconstructing unit for adding output values of the inverse transform/inverse quantization unit to predicted values from the prediction unit and reconstructing the selected key block.

9. The image decoding apparatus of claim 7, wherein the non-key block decoding unit comprises:

an inverse transform/inverse quantization unit for performing an inverse transform and inverse quantization process on a signal corresponding to a non-key block encoding among the inputs of the encoded signals;

a spatial prediction unit for performing a spatial prediction process by using the values of the peripheral pixels of the current block and the key block reconstructed on the base of the key block decoding unit; and a non-key block reconstructing unit for adding an output value of the inverse transform/inverse quantization unit to a predicted value by the spatial prediction unit, and reconstructing the designated non-key block.

10. The image decoding apparatus of claim 7, further comprising an inverse transform/inverse quantization unit for performing an inverse transform/inverse quantization process on the inputs of the encoded signals, and a signal reconstructing unit for reconstructing the target block based on accumulated values output from the inverse transform/inverse quantization unit and a value merged by the merging unit.

11. An image encoding method, comprising:

splitting a target block of an input image to be encoded into a plurality of subblocks according to positions of pixels;

selecting a random key block having a size larger than a pixel size of at least one of the plurality of split subblocks, and performing an intra-prediction or inter-prediction encoding process on a selected key block; and designating the rest of the subblocks, except for the selected key block among the split subblocks, as a designated non-key block, and performing a spatial prediction process on the designated non-key block by using values of peripheral pixels of a current block and a key block reconstructed by performing the intra-prediction or inter-prediction encoding process on the selected key block.

12. The image encoding method of claim 11, further comprising:

predicting pixel values of the selected key block, calculating an error value from a current pixel, transforming and quantizing a calculated error value, and transmitting a transformed and quantized error value to an entropy encoder;

performing an inverse transform and inverse quantization process on a transformed and quantized error value; and adding an inversely transformed and inversely quantized output value to a predicted value, and reconstructing the selected key block.

13. The image encoding method of claim 11, further comprising:

predicting pixel values of the designated non-key block, calculating an error value from a current pixel, transforming and quantizing a calculated error value, and transmitting a transformed and quantized error value to an entropy encoder;

performing an inverse transform and inverse quantization process on the transformed and quantized error value; and accumulating inversely transformed and inversely quantized output values and reconstructing the designated non-key block.

14. The image encoding method of claim 11, further comprising:

calculating a prediction error value by intra-prediction or inter-prediction on the target block of the input image, transforming and quantizing a calculated prediction error value, and transmitting a transformed and quantized prediction error value to an entropy encoder;

performing an inverse transform and inverse quantization process on a transformed and quantized error value; and accumulating output values by the inverse transform and inverse quantization process and reconstructing the target block based on accumulated values.

15. An image decoding method, comprising:

reading encoding information and subblock information of a target block to be decoded, with respect to inputs of encoded signals;

when the target block is determined by the process of reading to be key-block-encoded and non-key-block-encoded, selecting a key block based on the subblock information read from the encoded signals, and performing a prediction process on pixel values of the key block selected among subblocks corresponding to the subblock information;

designating the rest of the subblocks, except for a selected key block among the subblocks, as a non-key block, and performing a prediction process spatially on a designated non-key block by using values of peripheral pixels of a current block and a key block reconstructed based on the prediction process on the key block; and reconstructing the inputs of the encoded signals based on a value predicted by the prediction process on the key block and a value predicted by the spatial prediction process on the non-key block.

16. The image decoding method of claim 15, further comprising:

performing an inverse transform and inverse quantization process on a signal corresponding to a key block encoding among the inputs of the encoded signals; and adding a value output by the inverse transform/inverse quantization process to the value predicted by the prediction process, and reconstructing the selected key block.

17. The image decoding method of claim 15, further comprising:

performing an inverse transform and inverse quantization process on a signal corresponding to a non-key block encoding among the inputs of the encoded signals; and adding a value output by the inverse transform/inverse quantization process to a value predicted by the spatial prediction process, and reconstructing the designated non-key block.

18. The image decoding method of claim 15, further comprising:

performing an inverse transform/inverse quantization process on the inputs of the encoded signals; and merging a key block reconstructed based on the prediction process on the key block and a non-key block reconstructed by the prediction process on the non-key block, wherein the process of reconstructing the encoded signals reconstructs the target block by adding a value merged by the merging process to accumulated values output by the inverse transform/inverse quantization process.

* * * * *